United States Patent [19]
Horn et al.

[11] 3,728,675
[45] Apr. 17, 1973

[54] CYCLE ALARM APPARATUS

[75] Inventors: Raymond W. Horn, Moorestown, N.J.; Ignatius F. Bash, Huntingdon Valley, Pa.

[73] Assignee: DVA Corporation, Mt. Laurel Township, N.J.

[22] Filed: May 17, 1971

[21] Appl. No.: 144,014

[52] U.S. Cl.................340/65, 340/52 H, 200/42, 200/61.52
[51] Int. Cl..........................................B60r 25/10
[58] Field of Search..............340/63, 64, 65, 52 H; 200/42, 61.45, 61.52

[56] References Cited

UNITED STATES PATENTS

| | | | |
|---|---|---|---|
| 3,531,793 | 9/1970 | Shottenfield | 340/63 UX |
| 1,298,055 | 3/1919 | Kershaw | 340/65 |
| 3,461,423 | 8/1969 | Trumble | 340/63 |
| 2,823,367 | 2/1958 | Huron | 340/65 X |

*Primary Examiner*—Alvin H. Waring
*Attorney*—Howson and Howson

[57] ABSTRACT

Alarm apparatus suitable for attachment to a motorcycle for producing an audible alarm when an unauthorized person tilts the cycle from the reset position in which it was left. The apparatus comprises a casing containing the alarm circuit and a self-contained power supply, the casing being mountable in a fixed angular position on the motorcycle, preferably at the rear of the cycle so that the license plate can then be mounted over the rear of the casing. The casing is held to the cycle by fastening means which are accessible only when a removable portion of the casing is removed, and the alarm circuit is responsive to the removal of the closure portion of the casing to produce an electrical alarm signal when the closure portion is removed so that one cannot remove the entire casing or open the casing to disable it without sounding the alarm. The angle of the cycle is sensed by a pair of mercury switches within the casing, one for sensing tilt in one angular direction and the other for sensing tilt in the other angular direction from a reference angular position normally defined by the position in which the cycle is held by its stand. The two mercury switches are preferably independently adjustable in angular position so as to accommodate any stand angle. The battery within the casing energizes an alarm circuit whenever either one of the mercury switches is closed by tilting of the cycle or when the closure for the casing is removed, provideded also that a key-operated line switch has also been closed by the operator upon leaving the cycle. The alarm circuit includes a timing circuit such that when one of the switches has been closed and is then reopened, the alarm signal will continue for a predetermined length of time and will then terminate, thereby providing an adequate alarm in case of tampering with the cycle yet preventing continued operation of the alarm which will unduly deplete the battery supply.

11 Claims, 9 Drawing Figures

PATENTED APR 17 1973　　　　　　　　3,728,675
SHEET 1 OF 3
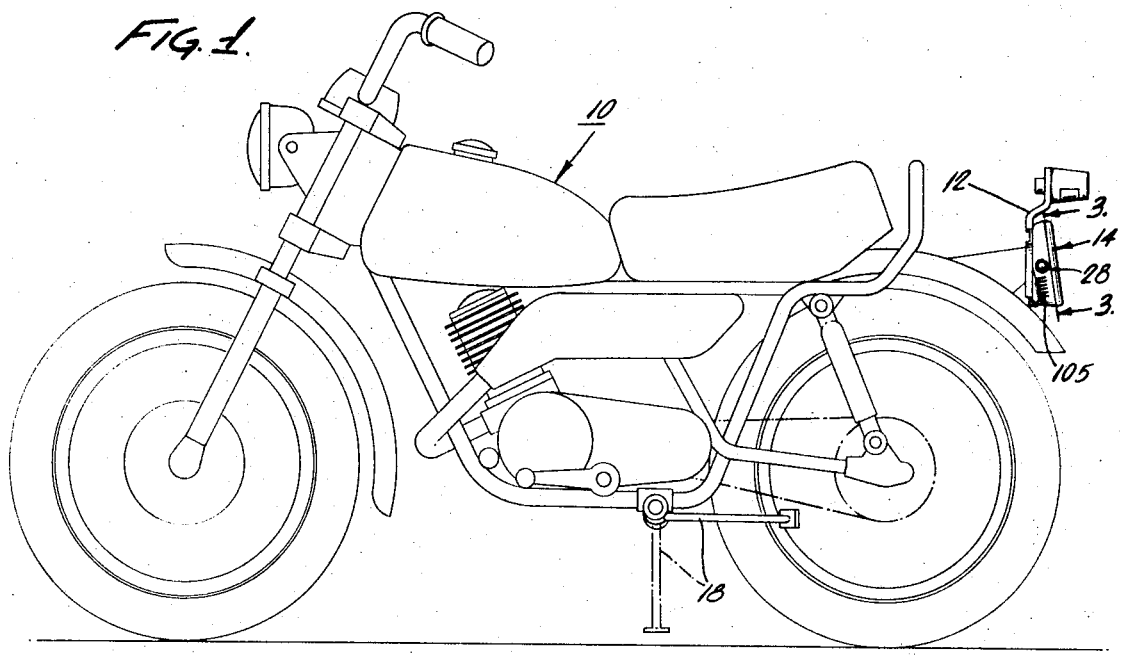
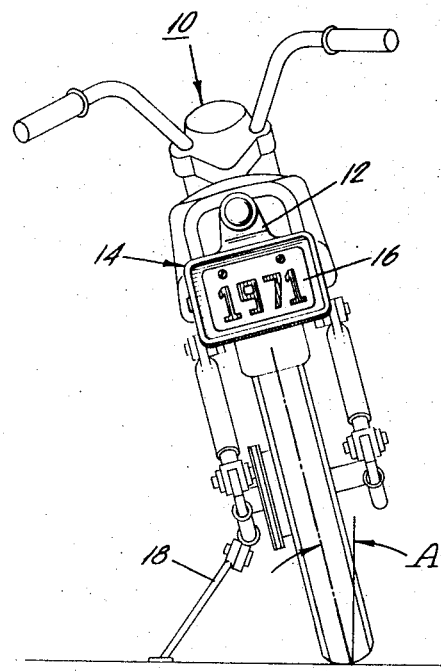
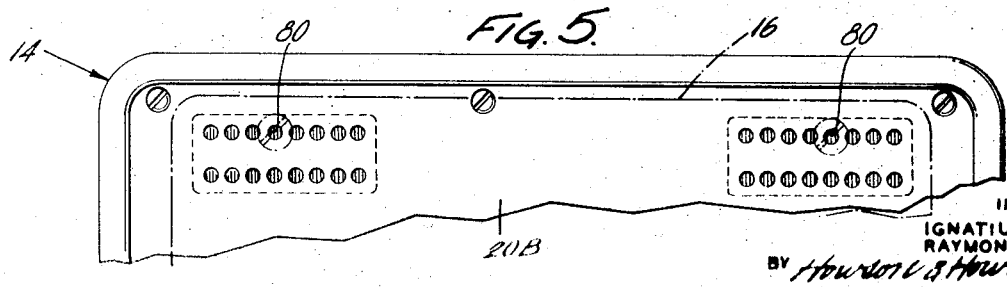
INVENTORS:
IGNATIUS F. BASH
RAYMOND W. HORN
BY Howson & Howson
ATTYS.

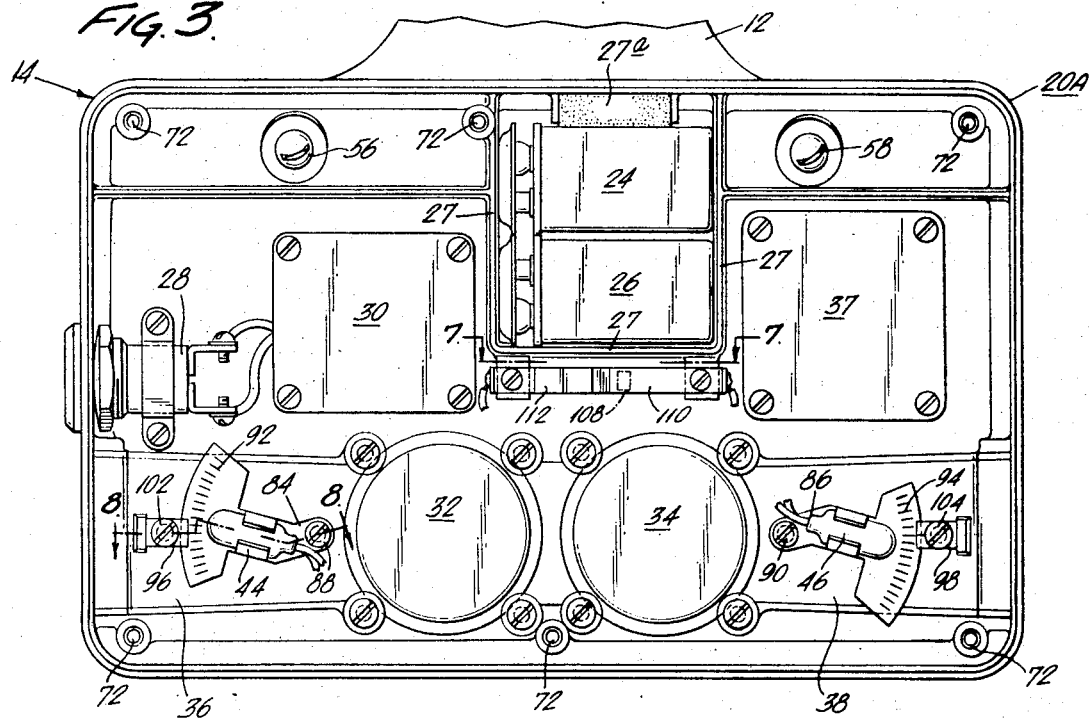
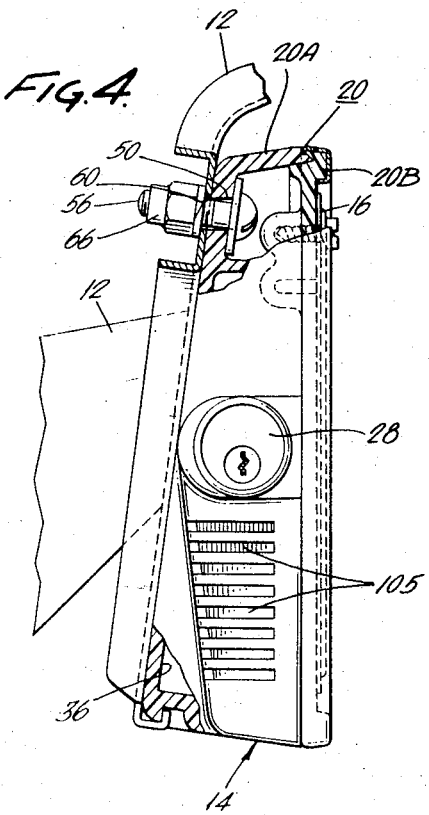
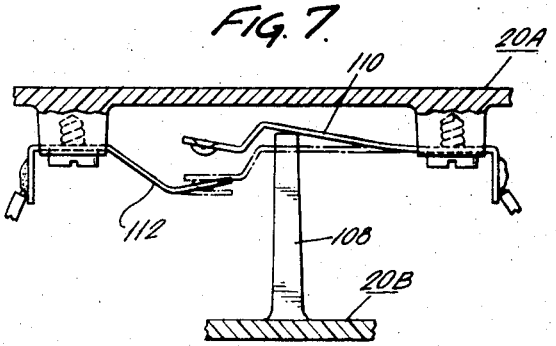
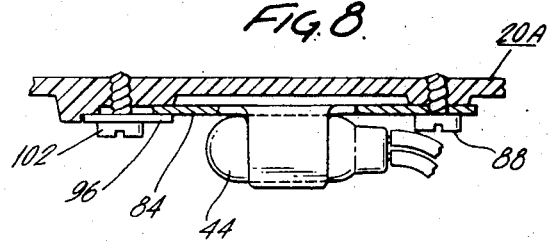

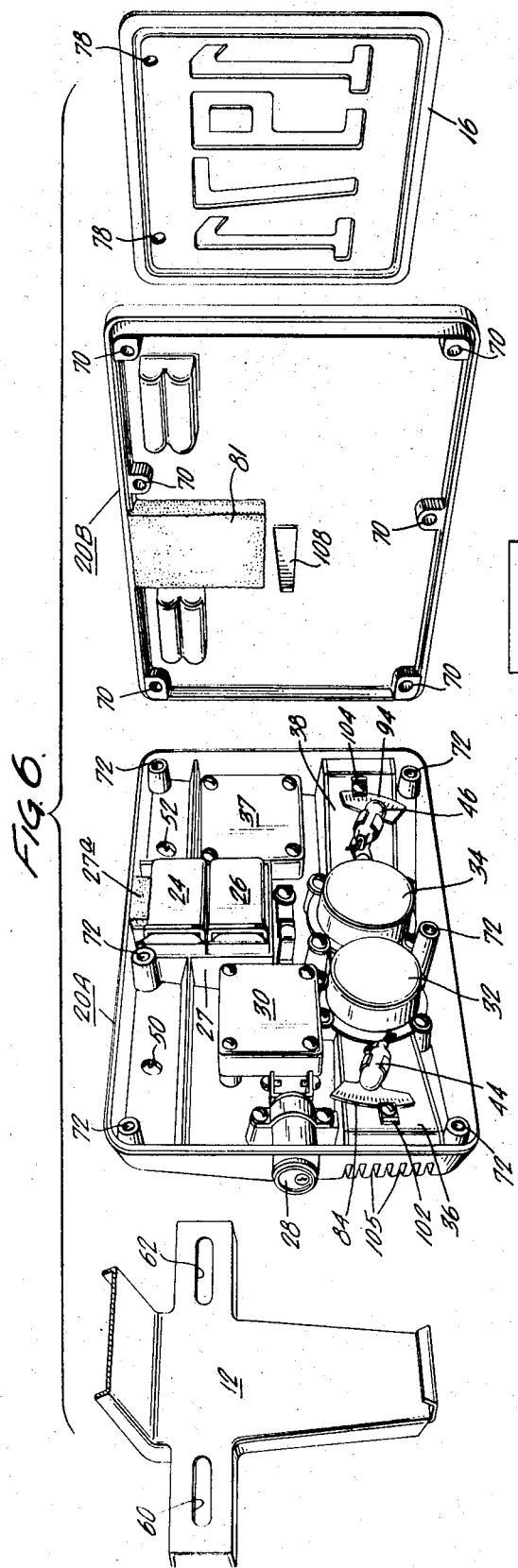
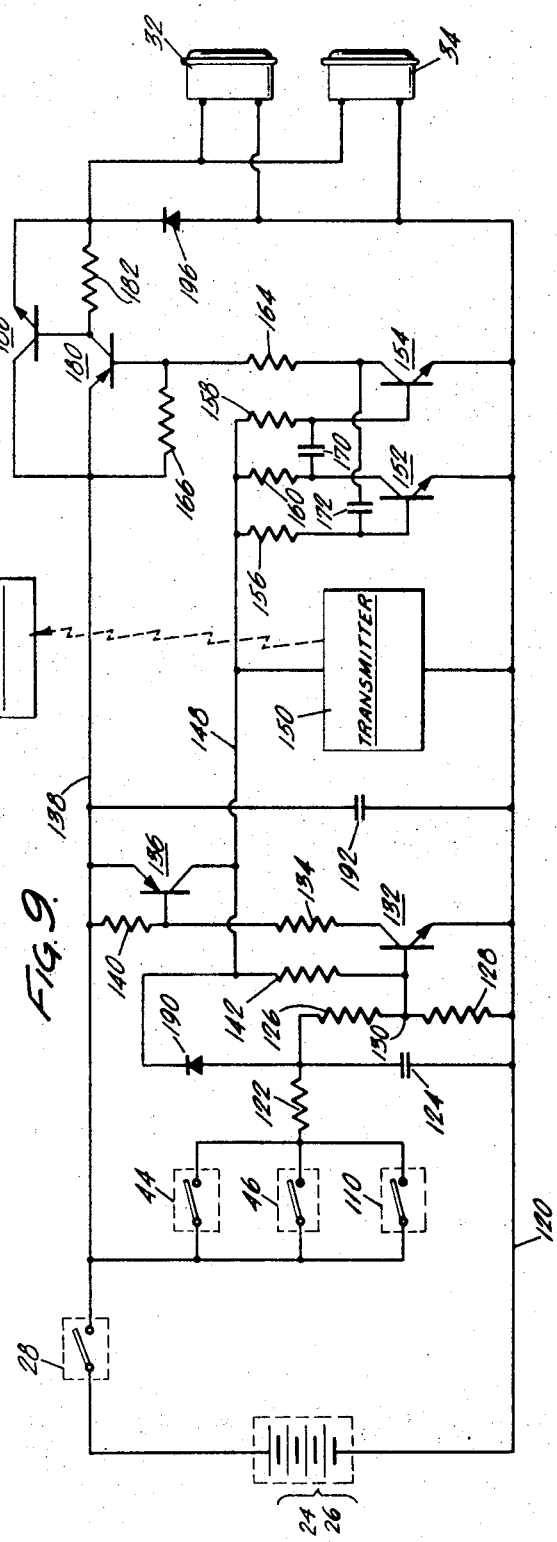

CYCLE ALARM APPARATUS

BACKGROUND OF THE INVENTION

Unauthorized taking, and particularly stealing, of cycles, and especially motorcycles, has become a serious problem in recent years. A large percentage of new motorcycles are in fact stolen within the first few weeks of their ownership. For this reason it has become desirable to provide a motorcycle with an alarm circuit which will provide an alarm when an unauthorized person tampers with, or takes, the motorcycle.

A variety of apparatus is known in the prior art for providing some degree of protection to automobiles when they are tilted or subjected to vibration. Typical of such patents are the following: U. S. Pat. Nos. 1,298,055; 2,823,367; 1,305,352; 3,461,423; and 3,422,398. Apparatus is also known for providing an alarm upon the theft of a bicycle by means which sense certain tilts of the bicycle and sound an alarm in such an event. Typical of such devices are those devices described in German Pat. No. 233,013; in Swiss Pat. No. 236,333; and in Italian Pat. No. 359,558. Apparatus is also known in the art in which a ball-type switch of the gravity-acting type is used to sense the erecting of a motorcycle from its stand position to sound an audible alarm.

However, the above described types of apparatus are characterized by one or more of the following types of drawbacks or limitations. In some cases they are so complicated as to be relatively unreliable; in other cases they are subject to rather easy defeat by a knowledgeable thief; in other cases they require excessive care or maintenance; and, finally, in most cases where a substantial degree of theft protection is provided, they are expensive to manufacture.

Accordingly, it is an object of the invention to provide a new and useful cycle alarm apparatus.

Another object is to provide such apparatus which provides a high degree of theft protection, and yet is relatively inexpensive to make.

A further object is to provide such apparatus which cannot be readily defeated by tampering with, or complete removal of, the unit.

A further object is to provide such apparatus which is readily adapted to combined use as a mounting for a license plate of the cycle.

It is also an object to provide such an apparatus in which unnecessary drain on the supply battery is avoided.

Another object is to provide such apparatus which can be readily adapted for use with different stand angles of the cycle, and which can be readily adjusted to the optimum sensitivity.

SUMMARY OF THE INVENTION

These and other objects of the invention are achieved by the provision of cycle alarm apparatus which utilizes at least one of the following features, and preferably utilizes all of them in the same apparatus to achieve maximum theft protection at lowest cost.

The cycle alarm is provided with an external casing having a removable closure portion and having a mounting portion which is fixedly mountable to the cycle by fastening means which are accessible only when the removable portion is removed. The alarm circuit, including its self-contained supply source, is contained within the casing and produces an electrical alarm signal to operate a horn within the casing and/or to transmit a signal to a remote receiver. The alarm circuit is responsive to removal of the closure portion of the casing to produce an electrical alarm signal, so that if one attempts to remove the closure for the purpose of disabling the circuit, or for the purpose of demounting the casing entirely, a suitable alarm will be given. The angle sensing means preferably comprise a pair of mercury switches fixed to the casing in adjustable respective positions with respect to the vertical and with respect to each other, so that they can be adjusted to provide optimum sensitivity with respect to any predetermined reference angle of the cycle, normally the stand angle. If the thief then moves the cycle in either angular position from its rest angle, the alarm will be sounded. Preferably also, the alarm circuit comprises timing means for maintaining the alarm circuit in its activated condition for a predetermined time interval after the tilting to be detected, or the removal of the case closure, is terminated, whereby an appropriate signal will be given even if there is only momentary tilting but will be continued for only a limited length of time so as not to run-down the internal battery. The casing and its mounting are preferably such that the usual license plate can be mounted to the rear face of the casing. The resultant cycle alarm is therefore sensitive to tampering, difficult for a thief to defeat, compact and readily mounted behind the usual license plate, provides minimum drain on the internal battery, and yet is inexpensive to fabricate and maintain.

BRIEF DESCRIPTION OF FIGURES

These and other objects and features of the invention will be more readily understood from a consideration of the following detailed description, taken in connection with the accompanying drawings, in which:

FIG. 1 is a side view of a motorcycle having mounted thereon a cycle alarm in accordance with the invention;

FIG. 2 is a rear view of the motorcycle FIG. 1, showing its normal stand angle;

FIG. 3 is a rear elevational view of the alarm apparatus of the invention, with the closure portion removed so as to expose the interior thereof;

FIG. 4 is an end elevational view of the cycle alarm of FIG. 3, with parts broken away;

FIG. 5 is a fragmentary view of the rear of the cycle alarm, showing the license plate mounting arrangement near the upper edge thereof;

FIG. 6 is an exploded perspective view of the cycle alarm;

FIGS. 7 and 8 are fragmentary sectional views taken along lines 7—7 and 8—8, respectively, of FIG. 3; and FIG. 9 is an electrical schematic diagram for the cycle alarm.

Referring now to the embodiment of the invention shown in the drawings by way of example only, FIGS. 1 and 2 show a motorcycle 10 having a conventional rear license plate bracket 12 to which the cycle alarm 14 is secured. As shown, the cycle alarm is completely enclosed and has no external connection or leads thereto. The cycle is provided with a stand 18, by virtue of which it may be left unattended in a standing position. In this example, the stand is of the type in which the cycle stands at an angle from the vertical, the angle in this example being indicated as A. It should be understood that other stand angles may be employed, and in fact in some cases the stand may be of the type which holds the cycle vertical.

Referring now to FIGS. 3-8, in which corresponding parts are indicated by corresponding numerals, the cycle alarm comprises an external casing 20 having a mounting portion 20A and a closure portion or cover 20B. In this example, the principal components of the alarm circuit are contained within the mounting portion 20A of the casing. In general, the alarm circuit components comprise the supply-voltage source consisting of batteries 24 and 26 positioned by a retaining frame 27 and resilient sponge 27A; a key-operated switch 28 available at the exterior of the casing by which the owner who possesses the key may turn on the alarm circuit when he leaves the cycle; the local alarm circuit 30 for generating an alarm signal to operate the two sound generators 32 and 34; a transmitter circuit 37, and which may be utilized to transmit the alarm signal to a remote receiver carried by the owner when he is away from his cycle; and the pair of independently angularly adjustable mercury switches 44 and 46 secured to the casing.

The mounting portion 20A of the casing is provided with mounting holes 50, 52 through which there extend fastening means in the form of screws 56 and 58. The screws 56 and 58 extend through the corresponding slots 60 and 62 in the license bracket 12, and engage with a corresponding pair of locknuts such as 66, which are of known form such that they cannot be removed from the exterior by turning them, without holding the screws against rotation from the interior side of the casing.

The closure portion 20B of the casing is provided with the six cover-mounting holes such as 70, and corresponding internally-threaded bosses such as 72 are provided in the interior of the mounting portion 20A of the casing to receive the cover-mounting screws extending through holes 70. The license plate 16 is mounted on the rear surface of the casing by means of suitable screws extending through the two holes 78 in the license plate and into the appropriate corresponding pair of the set of threaded recesses, such as 80, provided in the rear of the cover plate to accommodate different sizes of license plates. A sponge retainer 81 is mounted on the inside of the cover 20B to hold the batteries 24, 26 in position when the cover is closed.

The two mercury switches 44 and 46 are mounted on corresponding respective pivot arms 84, 86, the pivots for which arms are designated as 88 and 90 respectively. The pivot arms are provided with angularly graduated scales 92, 94, and corresponding holding tabs 96, 98, are also provided to clamp each of the arms in its adjusted position by tightening of clamping screws 102, 104. The two sounds generators 32 and 34 are provided with appropriate corresponding horns 36 and 38 for communicating the generated sounds to respective openings such as 105 in opposite ends of the casing portion 20A so that they may be readily heard externally of the casing.

As is shown particularly clearly in FIG. 7, the closure portion 20B of the casing is provided with an inwardly-extending prong 108 which, when the cover is fastened in position, holds the switch arm 110 in the open position shown in full line, so that electrical contact is not made to the corresponding switch arm 112, both of these switch arms being mounted to the interior of the casing portion 20A. However, when the cover is removed, the switch arm 110, which is of spring material, assumes the position shown in dotted line in FIG. 7, in which it is electrically closed to arm 112 to complete an electrical circuit therewith. This arrangement therefore provides an electrical indication of whether the cover portion of the casing has been removed, as indicated by the open or closed condition of the switch arms 110 and 112.

The mercury switches 84 and 86 have the property that, when either is horizontal, the electrical contacts therein are open and not bridged by the mercury therein, but when either is tilted beyond horizontal in a given angular sense the contacts will be closed by the mercury therein. Thus if the stand angle A is 30°, mercury switch 84 will be set 30° above horizontal when the cycle is upright, and mercury switch 86 will be set 30° below horizontal under these conditions. Then, when the motorcycle is placed on its stand, both mercury switches will be in their horizontal and open circuit positions, but responsive to very small angular displacements to close at least one of the switches.

Referring now to FIG. 9, in which parts corresponding to those shown in the preceding figures are indicated by corresponding numerals, the direct current supply source 24, 26 has one terminal connected to a common reference-voltage line 120 and its other terminal connected through key switch 28 to one terminal of each of the mercury switches 44 and 46 and to the cover-closure sensing contact arm 110. The other contacts of the other terminals of each of these switch devices are connected through a resister 122 to the upper plate of capacitor 124, the lower plate of which is connected to the common line 120. Accordingly, when the key switch 28 is closed and one of the two mercury switches or the closure-sensing switch is closed, capacitor 124 will be charged rapidly to a positive potential, the resistor 122 merely serving to limit the current drawn from the battery under such conditions.

In parallel with capacitor 124 is connected a voltage divider made up of resistors 126 and 128, the tap point 130 of which is connected to the base of the NPN transistor 132. The collector 132 is connected through a resistor 134 to the base of a PNP transistor 136 and thence to the positive supply line 138 by way of resistor 140. The emitter of transistor 132 is connected directly to the common line 120, and the emitter of transistor 136 is connected to the positive supply line 138. The collector of transistor 136 is connected back to the base of transistor 132, by way of resistor 142, in regenerative fashion. Transistors 132 and 136, together with their associated circuits, constitute a trigger circuit whereby transistor 136 is normally non-conductive, but is rapidly and abruptly rendered conductive when the voltage across capacitor 124 is charged to a predetermined positive level by the closure of one of the switch devices 44, 46. or 110.

The line 148 to which the collector of transistor 136 is directly connected constitutes a secondary positive supply voltage line for the alarm circuitry now to be described. That is, when transistor 136 is in its non-conductive condition, line 148 is at a low positive potential, but when transistor 136 becomes conductive then substantially the entire positive supply voltage from line 138 is applied to line 148 to operate the circuits connected thereto.

A radio frequency transmitter 150 is connected between the secondary positive supply line 148 and common line 120 to radiate an appropriate radio-frequency signal to a receiver 151 tuned to the transmitted frequency, which may for example may be in the citizens' band. Such a receiver may be carried by the operator when he leaves his motorcycle, and the radio frequency signal will be modulated at an audio rate so that an audible signal is provided by the operator's receiver when an alarm signal occurs.

Transistors 152 and 154 of the NPN type are connected in the common-emitter configuration. The bases of the two transistors are connected through respective base-biasing resistors 156 and 158 to the secondary positive supply line 148; the collector of transistor 152 is connected through collector load resistor 160 to the same line 148; and the collector of transistor 154 is connected through resistors 164 and 166 to the primary positive supply line 138. The collector of transistor 152 is also coupled by capacitor 170 to the base of transistor 154, and the collector of transistor 154 is coupled to the base of transistor 152 by capacitor 172. Transistors 152 and 154 and their associated circuitry constitute a symmetrical astable flip-flop which oscillates at a low rate, e.g. at about 2 cycles per second.

The tap point between collector resistors 164 and 166 is connected to the base of a transistor 180 of the PNP type, the emitter of which is directly connected to the primary positive supply line 138 and the collector of which is connected through resistor 182 to one terminal of each of the sound-generating devices 32 and 34, the other terminals of each of which devices are connected to the common reference line 120. An NPN transistor 186 has its base connected directly to the collector of transistor 180 and its collector connected directly to the emitter of transistor 180; the emitter of transistor 186 is connected to the same terminal of sound-generating devices 32 and 34 as is resistor 182.

The two transistors 180 and 186 with their associated circuitry constitute a solid-state switch which is turned on and off by the output of transistor 154 at the above-mentioned typical two-cycles-per-second rate, so that the main positive supply voltage from line 138 is applied across the two sound-generating devices 32 and 34 at the latter two cycle rate whenever one of the switch devices 44, 46 or 110 is closed and the key switch 28 is also closed.

A rectifier device 190 is also employed, its anode being connected to the junction between resistors 122 and 126, and its cathode being connected directly to the line 148; its function will be described hereinafter. A relatively large-valued capacitor 192 is connected directly between the primary positive supply line 138 and the common reference line 120 to smooth out the instantaneous supply voltage variations which tend to occur when the sound-generating devices 32 and 34 operate. A rectifier 196 is also provided, with its cathode connected to the emitter of transistor 186 and its anode connected to the common reference line 120, to suppress the inductive kick which tends to occur when the two sound-generating devices are suddenly turned off by the solid state switch.

Considering now the operation of the cycle alarm, the mounting portion 20A of the casing is first secured to the license mount 12 by the fastening means referred to above; the cover or closure portion 20B is then placed in position to close the casing and secured by screws as described above; and the license plate 16 is then screwed to the rear side of the cover. The mercury switches 44 and 46 will have previously been adjusted so that, when the cycle is in its standing position, each mercury switch is substantially horizontal. Before the key switch 28 is operated, the entire circuit will be inoperative, since the battery is disconnected from all of the circuitry by the open switch 28. When the operator wishes to park his cycle, he places it on its stand at the usual stand angle and uses his key to close the key switch 28. Assuming that the ground beneath the cycle is level, there should be no operation of the alarm at this time since both of the mercury switches will be open circuited and the sensing switch arm 110 will be held in its open position by the cover prong 108. However, if the ground beneath the cycle is not quite horizontal, one of the mercury switches may close, causing the alarm to sound. The operator will then immediately reopen the key switch and, because of the presence of the diode 190, the charge on capacitor 124 will be more rapidly dissipated through the transistors of the astable multivibrator than would be the case if only the normal discharge path through resistor 126 were available. The operator may then promptly adjust the cycle to a more level position such that when he operates the key switch 28 again there is no alarm. In normal operation, rectifier 190 is biased in its non-conductive state and does not affect the above-described operation.

Under these conditions, the upper plate of capacitor 124 will be at the potential of reference line 120 and the trigger circuit including transistor 136 will be in its non-conductive state so that only a low positive potential will be communicated to secondary positive supply line 148 from the primary positive supply line 138. The voltage then appearing on line 148 is insufficient to operate the transmitter or the astable flip-flop, and the solid-state switch composed of transistors 180 and 186 will remain opened so that the sound-generating devices 32 and 34 cannot operate.

Now, if an unauthorized person such as a thief moves the cycle to a more upright position to drive it away, one of the mercury switches will close, charging capacitor 124 rapidly to the point at which the trigger circuit causes transistor 136 to conduct and supply operating potential to the transmitter and to the flip-flop circuit, whereby intermittent audible sounds are produced by the generators 32 and 34 to serve as an audible alarm. Should the thief try to defeat the system by tilting the cycle below its standing angle to carry or wheel it away, the other mercury switch will close and a similar alarm will be given. This alarm will continue as long as the cycle is in an angular position other than its exact standing angle. The angular position of the mercury switches can be adjusted very closely to the standing angle to obtain maximum sensitivity for any given stand. For example, they may be adjusted so that even slight tampering with the cycle will activate the alarm, which will occur if the mercury switches are set very closely to each side of the reference angle; or, they can be set farther from the reference angle if the operator intends to park his cycle on uneven terrain and wishes to provide a greater tolerance in the angle for which no alarm is produced.

Once the alarm has started, it will continue for a period of time determined by the discharge time-constant of the capacitor 124 and the resistance of the circuit in parallel with the capacitor, even if the cycle resumes its reference standing angle. This means that an alarm of reasonable duration (e.g. 30 seconds) will be provided under such circumstances, but will not continue indefinitely so as to run down the batteries should, for example, a child accidentally or innocently jolt the cycle slightly so as to cause an alarm.

Furthermore, if several thieves should attempt to carry the cycle away by lifting it and very carefully maintaining its tilt angle, it is highly unlikely that they could succeed, not only because it would be difficult to maintain the tilt angle with the required accuracy but also because the mercury switches are sensitive to acceleration as well as to tilt angle, and hence any uneven motion of the cycle will be likely to cause a momentary closing of one of the mercury switches and result in the sounding of the alarm. Once the alarm has thus been triggered, the thieves would not be able to adjust the angle of the cycle to the point at which the alarm would disappear, since under these conditions the alarm will continue throughout during the predetermined timing interval even if the correct standing angle is resumed. The thieves would therefore have to continue carrying the cycle with the alarm sounding, or else set it down on the level again until the alarm had shut itself off.

After completion of each alarm cycle, the circuits are automatically reset for the next cycle without requiring any manual resetting. The two sound-generating devices preferably operate at slightly different frequencies of vibration, producing a discordant sound which increases their attention-getting effectiveness. The fact that the horns are turned on and off intermittently during the alarm not only increases their effectiveness in attention-getting, but also reduces the average drain on the battery, thereby increasing battery life by a factor of nearly two times.

The transmitter enables the operator, who carries the corresponding receiver, to leave the cycle, for example to go into a restaurant or office, while at the same time providing an audible alarm at his receiver if any one tampers with his cycle. This feature is optional, since the entire transmitter unit can be merely inserted into place mechanically and held with appropriate screws, only two electrical connections being required, one to the common reference line and one to the secondary positive supply line. Furthermore, the knowledge among the thieving profession that such a transmitter may be employed will serve to discourage them from attempting to steal the cycle even if it is remote from persons who might hear an audible alarm directly from the alarm casing itself.

Since the entire circuitry is within the casing, it cannot be disabled from the exterior. Furthermore, it cannot be removed from the cycle without sounding the alarm, since opening of the cover releases the cover closure switch arm 110, completing the alarm circuit, and the fastening means for mounting the casing on the cycle are contained within the casing and cannot be released unless the cover is removed.

It is also noted that the apparatus is extremely compact and has low current drain, a feature provided in part by the use of semiconductor devices arranged in the circuit configuration described; operates reliably and effectively both locally and at a distance, when the transmitter is employed; can be made as sensitive or insensitive to tilting as is desired; serves to sense both directions of tilting; provides a predetermined interval of alarm with the advantages set forth hereinbefore; cannot be readily defeated by a thief; and yet is inexpensive to manufacture and operate.

While the invention has been described with particular respect to specific embodiments thereof in the interest of complete definiteness, it will be understood that it can be embodied in a variety of forms diverse from those specifically shown and described, without departing from the spirit and scope of the invention as defined by the appended claims.

What is claimed is:

1. A cycle alarm, comprising:
   an enclosure adapted to be secured to a cycle;
   angle-sensing switch means secured to and within said enclosure, comprising a first switch having a first condition in which it remains so long as said enclosure is positioned within a predetermined range of angular positions with respect to the vertical and responsive to a departure of said enclosure from said range of angular positions to actuate said first switch to a second condition thereof;
   a source of electrical supply voltage within said enclosure;
   alarm means within said enclosure for generating alarm signals when supplied with said supply voltage;
   means connecting said source and said first switch with said alarm means to generate said alarm signals when said first switch is actuated to said second condition thereof;
   means for continuing said alarm signals for at least a predetermined interval after each actuation of said first switch to said second condition despite return of said switch to said first condition thereof, and for terminating said alarm signals automatically at a time following return of said switch to said first condition by an interval equal to said predetermined interval.

2. The cycle alarm of claim 1, in which said angle-sensing means comprises a second switch in parallel with said first switch, said first switch being actuated to its closed condition when said enclosure departs from said range of angular positions in one angular sense, and said second switch being operated to its closed condition when said enclosure departs from said angular range in the opposite angular sense, each of said first and second switches being independently settable to different angular positions with respect to said enclosure.

3. The cycle alarm of claim 1, in which said alarm means comprises sound generating means responsive to supply thereto of said supply voltage to sound an audible alarm.

4. The cycle alarm of claim 3, comprising electronic switch means connected between said source and said sound generating means, said electronic switch means being normally open but responsive to actuation of said first switch to said second condition to be rendered conductive at least intermittently.

5. The cycle alarm of claim 4, comprising means responsive to actuation of said first switch to said second condition to render said electronic switch means intermittently conductive, thereby to sound said audible alarm intermittently.

6. The cycle alarm of claim 1, comprising a trigger circuit connected between said first switch and said alarm means initiating operation of said alarm means only when the voltage supplied to said trigger circuit rises above a predetermined level.

7. The cycle alarm of claim 6, comprising resistance-capacitance timing circuit means connected between said source and said trigger circuit by way of said first switch for providing prompt turn-on of said trigger circuit when said first switch is actuated to said second condition and for delaying by a predetermined time interval the turn-off of said trigger circuit when said first switch is returned to said first condition.

8. The cycle alarm of claim 1, comprising a key switch on said enclosure connected to control connection of said source to the remainder of the circuit.

9. The cycle alarm of claim 8, comprising capacitance means for maintaining operation of said alarm means for a predetermined time interval after each actuation of said first switch to said second condition, and diode means connected to discharge said capacitance means more rapidly when said key switch is open than when said key switch is closed and said first switch is open.

10. The cycle alarm of claim 1, in which said enclosure is provided with a removable cover portion, and with another portion mountable to said cycle and having fastening means operable only from the interior of said enclosure to remove said enclosure from said cycle, said enclosure containing additional switch means operable in response to removal of said cover portion to operate said alarm means.

11. The cycle alarm of claim 1, in which said alarm means comprises means responsive to application thereto of said supply voltage to generate audio-modulated radio-frequency signals for radiation to a remote receiver.

* * * * *